(12) United States Patent
Oshida

(10) Patent No.: US 8,988,739 B2
(45) Date of Patent: Mar. 24, 2015

(54) IMAGE READING APPARATUS

(71) Applicant: Canon Kabushiki Kaisha, Tokyo (JP)

(72) Inventor: Haruhisa Oshida, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 13/777,863

(22) Filed: Feb. 26, 2013

(65) Prior Publication Data

US 2013/0242356 A1 Sep. 19, 2013

(30) Foreign Application Priority Data

Mar. 16, 2012 (JP) ................. 2012-060956

(51) Int. Cl.
*H04N 1/04* (2006.01)
*H04N 1/028* (2006.01)
*H04N 1/00* (2006.01)

(52) U.S. Cl.
CPC ......... *H04N 1/02815* (2013.01); *H04N 1/0049* (2013.01); *H04N 1/00631* (2013.01); *H04N 2201/0091* (2013.01)
USPC ............ 358/474; 358/498; 358/497; 358/496

(58) Field of Classification Search
USPC .......................... 358/474, 498, 497, 496, 475
See application file for complete search history.

(56) References Cited

U.S. PATENT DOCUMENTS

| | | | | |
|---|---|---|---|---|
| 7,463,392 | B2 | 12/2008 | Yamamoto et al. | 358/496 |
| 7,515,312 | B2 | 4/2009 | Murakami et al. | 358/461 |
| 7,755,812 | B2 | 7/2010 | Oshida et al. | 358/496 |
| 8,064,105 | B2 | 11/2011 | Murakami et al. | 358/461 |
| 8,422,934 | B2 * | 4/2013 | Penke et al. | 399/405 |

FOREIGN PATENT DOCUMENTS

| | | |
|---|---|---|
| JP | 08-339107 | 12/1996 |
| JP | 2008-010902 | 1/2008 |

* cited by examiner

*Primary Examiner* — Houshang Safaipour
(74) *Attorney, Agent, or Firm* — Fitzpatrick, Cella, Harper & Scinto

(57) ABSTRACT

An image reading apparatus comprising: a placing portion on which an original being fed is placed; an original conveying portion which conveys the original placed on the placing portion; an image reading portion which reads an image on the original conveyed by the original conveying portion; an stacking portion which is disposed under the placing portion and on which the original read by the image reading portion is stacked; and an illuminating portion which is disposed above the stacking portion and below the placing portion to illuminate the stacking portion, wherein the illuminating portion is disposed outside an original stacking area, that a maximum-sized original in a width direction orthogonal to an original conveyance direction is stacked, in the width direction.

6 Claims, 7 Drawing Sheets

IMAGE READING APPARATUS

BACKGROUND OF THE INVENTION

1. Field of the Invention

The present invention relates to an image reading apparatus which reads an image on an original.

2. Description of the Related Art

Conventionally, an image forming apparatus such as a digital copying machine is adapted to discharge an original on a fed original stacking portion to an original discharge portion provided below the fed original stacking portion via an original reading portion. Such operation is performed by an automatic original feeding apparatus (hereinafter referred to as an "ADF (Auto Document Feeder)") included in the image forming apparatus.

In the image forming apparatus, the original is conveyed from the fed original stacking portion to the original discharge portion by the ADF and removed from the original discharge portion by a user. There is a problem, however, that the area around the original discharge portion is darkened by the fed original stacking portion provided above the original discharge portion, thereby causing poor visibility of the original that is discharged. There is another problem that an original for a previous user and an original for a next user get mixed up on the original discharge portion when the previous user forgets to remove the original without noticing the discharged original.

As a method to improve the visibility of the original discharged to the original discharge portion, Japanese Patent Laid-Open No. 08-339107 discloses a sheet discharge tray provided between an image reading portion on the upper part of the apparatus and an image forming portion on the lower part of the apparatus. Also, it is suggested that an illumination lamp to illuminate inside the sheet discharge tray and improve the visibility of a recording sheet which is discharged onto the sheet discharge tray after recording has been performed onto the sheet by a copying operation or receiving a facsimile.

Moreover, Japanese Patent Laid-Open No. 2008-10902 discloses providing a lighting which illuminates the original discharge portion of the image reading portion, and providing a see-through portion which is on the fed original stacking portion and through which the original discharge portion can be seen. Also, an original detecting portion which detects the original that is discharged is provided. The lighting for illuminating the original discharge portion is provided. The lighting illuminates the original discharge portion when the original has been on the original discharge portion for a certain period of time. This can thus prevent the case where the user forgets to remove the original from the original discharge portion. Moreover, the lighting is turned off after a predetermined time elapses (such as after about 10 seconds) since the start of the illumination for saving electricity.

According to Japanese Patent Laid-Open No. 08-339107, however, the illumination light from the illumination lamp is intercepted by the sheet being discharged during the discharge operation for the sheet and thus does not reach the sheet discharge tray. Furthermore, when a number of sheets are stacked, a distance between the uppermost sheet of the stack and the illumination lamp is decreased to cause the range of illumination by the illumination lamp to shrink. Thus, it may be difficult to visually recognize the illumination light on the stacked sheet from outside.

According to Japanese Patent Laid-Open No. 2008-10902, the lighting is provided in the vicinity of the see-through portion provided on the fed original stacking portion, whereby the original discharged to the original discharge portion and illuminated by the illumination light can be visually recognized through the see-through portion when there is no original on the fed original stacking portion. When an original is on the fed original stacking portion, however, the illumination light onto the original stacked on the original discharge portion cannot be visually recognized through the see-through portion because the original blocks the see-through portion.

It tends to be difficult particularly in the image reading apparatus to visually recognize the illumination due to the narrow interval between the fed original stacking portion and the original discharge portion. The range of illumination by the illumination light also shrinks when the large amount of originals are stacked on the original discharge portion since the distance between the uppermost original of the stack and the lighting is decreased, thereby making it difficult to visually recognize the illumination light onto the stacked original. The same problem occurs in Japanese Patent Laid-Open No. 08-339107. Therefore, the visibility of the original discharge portion is reduced when the large amount of originals are stacked as compared to when the small amount of originals are stacked.

In the present invention that solves the aforementioned problems, it is desired that an image reading apparatus is provided in which the illuminated state of an original discharge portion does not vary much between during and after original discharge operation, or does not vary much regardless of the amount of originals stacked on the original discharge portion. It is further desired that an image reading apparatus is provided in which the effect of notifying an user to not forget to take out an original can be stably obtained.

SUMMARY OF THE INVENTION

In a representative configuration, an image reading apparatus comprising: a placing portion on which an original being fed is placed; an original conveying portion which conveys the original placed on the placing portion; an image reading portion which reads an image on the original conveyed by the original conveying portion; an stacking portion which is disposed under the placing portion and on which the original read by the image reading portion is stacked; and an illuminating portion which is disposed above the stacking portion and below the placing portion to illuminate the stacking portion, wherein the illuminating portion is disposed outside an original stacking area, that a maximum-sized original in a width direction orthogonal to an original conveyance direction is stacked, in the width direction.

Further features of the present invention will become apparent from the following description of exemplary embodiments with reference to the attached drawings.

DESCRIPTION OF THE EMBODIMENTS

One embodiment of an image reading apparatus according to the present invention will be described in detail with reference to the drawings.

Figure 1:
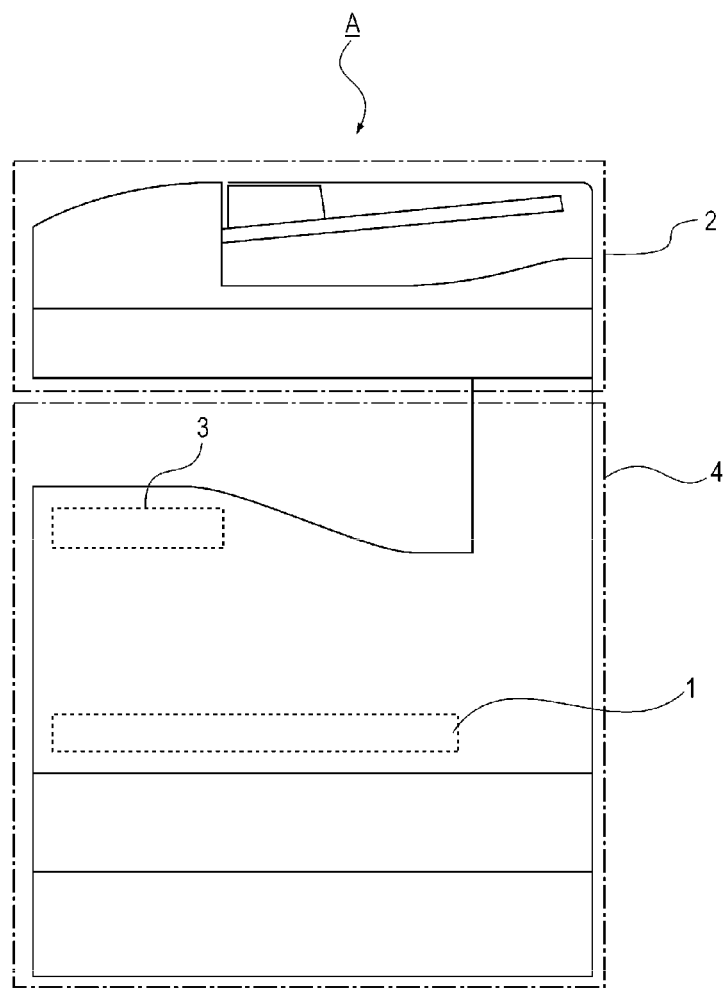
FIG. 1 is a schematic block diagram illustrating a configuration of an image forming apparatus including an image reading apparatus according to the present invention.
Figure 2A:
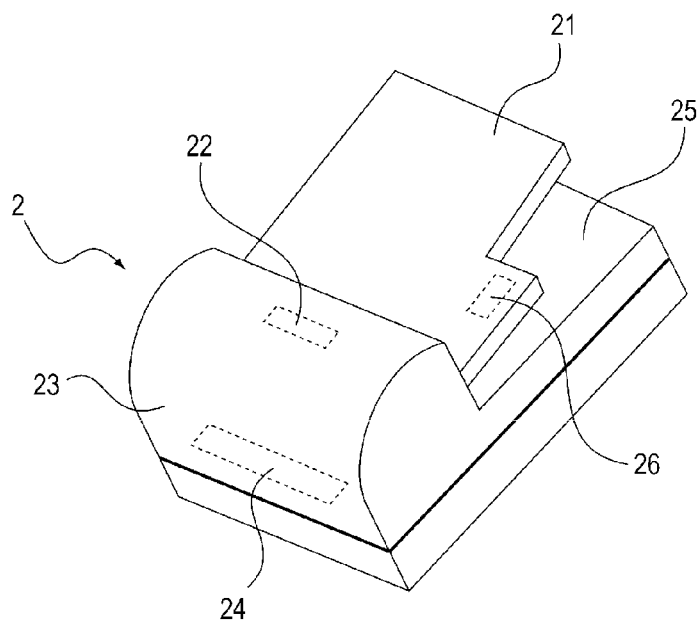
FIG. 2A is a schematic perspective view illustrating a configuration of the image reading apparatus according to the present invention.
Figure 2B:
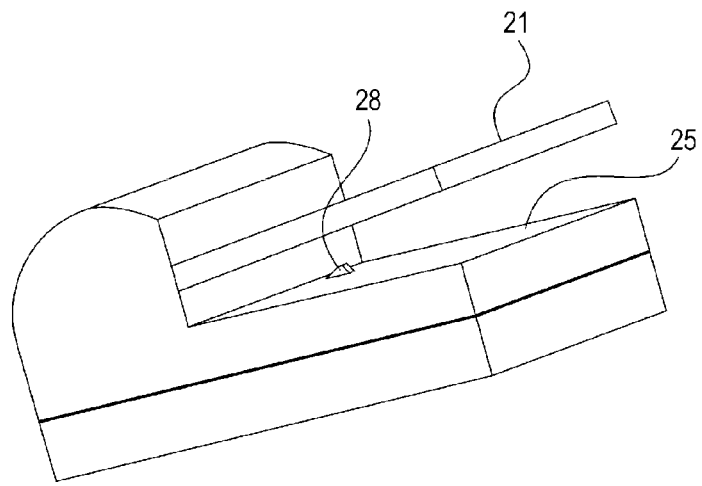
FIG. 2B is a schematic perspective view illustrating the configuration of the image reading apparatus according to the present invention.

As illustrated in FIG. 1, a copying machine A which is an image forming apparatus including an image reading apparatus according to the present invention includes: an image reading apparatus 2 which reads an image on an original 201; an image processing portion 3 which performs image processing such as density correction processing on the image read by the image reading apparatus 2; an image forming portion 4 which transfers and fixes a toner or the like onto a recording material based on image data on which the image processing has been performed by the image processing portion 3; and a controller 1 which controls the copying machine A. The description of a configuration and an operation of the image forming portion 4 will be omitted as it is widely known.

The configuration of the image reading apparatus 2 will now be described with reference to FIGS. 2 to 7.

The image reading apparatus 2 includes: a placing portion 21 on which the original 201 (document) fed by an automatic original feeding apparatus (hereinafter referred to as an "ADF (Auto Document Feeder)") is stacked; and a fed original detecting portion 22 which detects that the original 201 is stacked on the placing portion 21.

The image reading apparatus 2 further includes: an auto original feeding portion (an original conveying portion) 23 which conveys the original 201 stacked on the placing portion 21; an image reading portion 24 which reads an image on the original 201 conveyed by the auto original feeding portion 23; and an original discharge portion (a stacking portion) 25 which is disposed directly under (below) the placing portion 21 and in which the original 201 discharged by the auto original feeding portion 23 is stacked.

The image reading apparatus 2 further includes an illumination lamp 26 to be an illuminating portion which is disposed above the original discharge portion 25 and below the placing portion 21 to illuminate the original discharge portion 25. The placing portion 21 is an original tray, on a top surface of which the original 201 is stacked. The illumination lamp 26 is provided on a bottom surface of the original tray facing the original discharge portion 25. The image reading apparatus 2 further includes a discharged original detecting portion 28 which detects that the original 201 is discharged to the original discharge portion 25.

Figure 4:
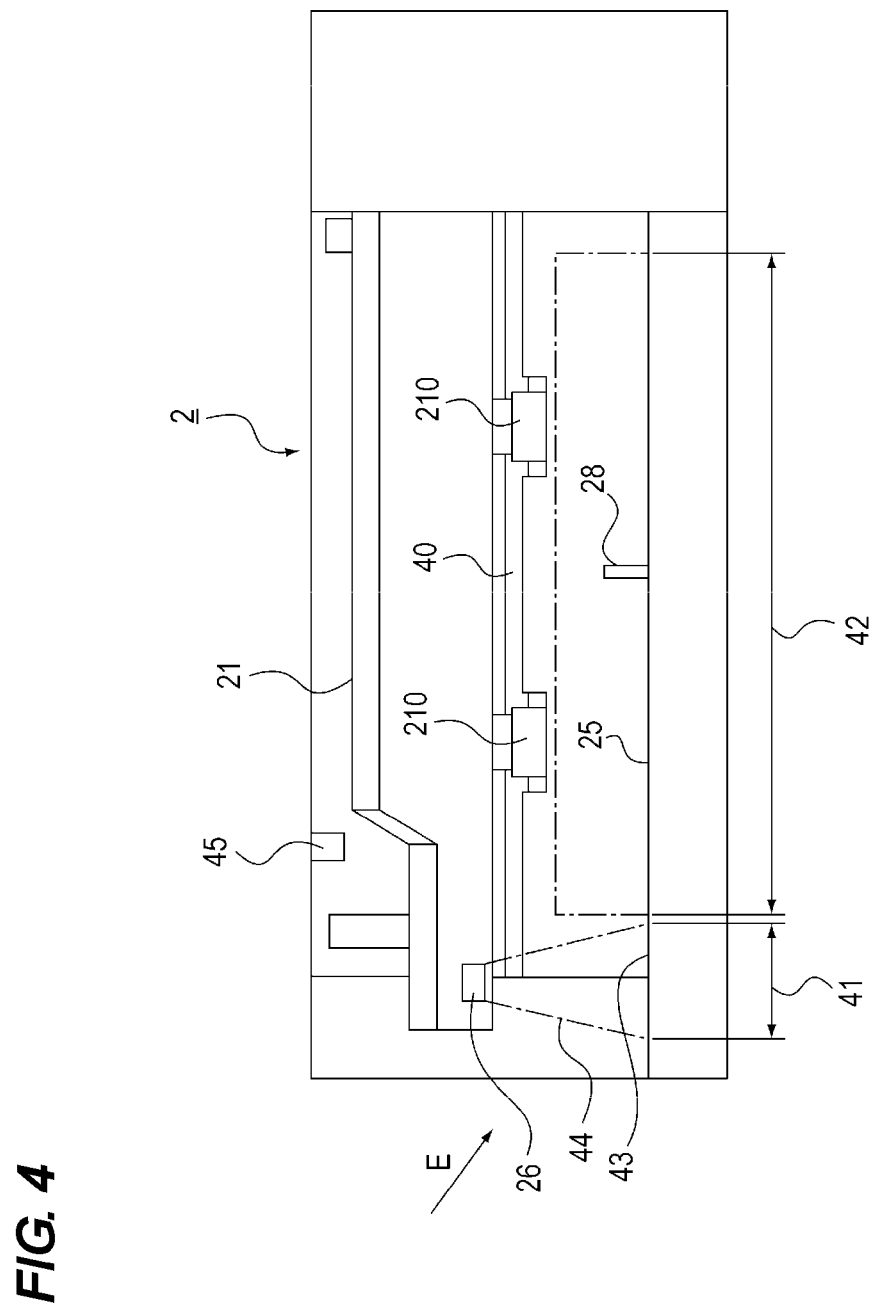
FIG. 4 is a side illustration viewed from a direction of an arrow C in FIG. 3.

As illustrated in FIG. 4, the illumination lamp 26 is disposed at a position outside an original conveyance path (a conveyance area) through which a maximum-sized original that can be used in the image reading apparatus 2 of the present embodiment passes, the original conveyance path corresponding to the width of a stacking area 42 in FIG. 4 in a direction orthogonal to an original conveyance direction (a horizontal direction in FIG. 4). The original discharge portion 25 includes the stacking area 42 in which the original 201 of the maximum size (the maximum-sized original) that can be used in the image reading apparatus 2 of the present embodiment is stacked, and an extended portion 43 extending from the stacking area 42 in the direction orthogonal to the original conveyance direction (the horizontal direction in FIG. 4).

As illustrated in FIG. 4, a range of illumination 41 by the illumination lamp 26 includes at least a part of the extended portion 43. The illumination lamp 26 and the range of illumination 41 thereof are arranged on a front side (a left side in FIG. 4) of a body of the image reading apparatus 2 (an image reading apparatus body) in the direction orthogonal to the original conveyance direction (the horizontal direction in FIG. 4).

Figure 3:
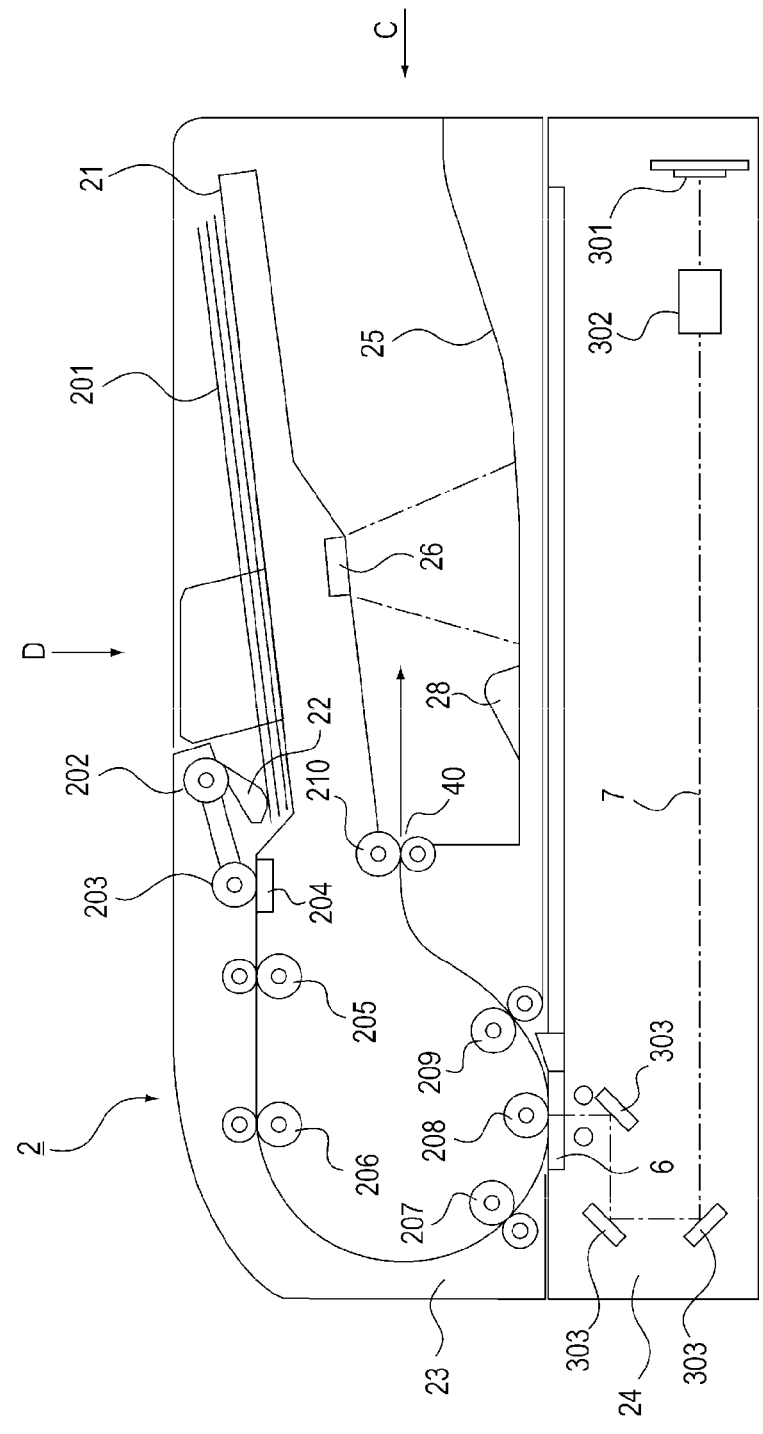
FIG. 3 is a cross-sectional illustration illustrating the configuration of the image reading apparatus according to the present invention.

As illustrated in FIG. 3, when the original 201 is set on the placing portion 21, the original 201 is detected by a fed original detecting portion 22, thereby causing a set original notification lamp 45 to be turned on to inform a user that the original 201 has been set.

The user then gives an original read command from an operation portion 5. In response to the command, the original 201 is fed into the image reading apparatus 2 by a feed roller 202 positioned on an upper part of the placing portion 21. The original 201 is separated into a single sheet by the cooperation of a separation roller 203 and a separation pad 204 and conveyed starting with the uppermost sheet.

An edge of the original 201 separated into a single sheet is aligned by a registration roller 205. After the edge of the original 201 is aligned by the registration roller 205, the original 201 is conveyed by conveying rollers 206 and 207, and the image on the original 201 conveyed is read by a platen roller 208 disposed in an opposed relation to a platen 6 of the image reading portion 24.

A reflected light 7 from the original 201 is reflected by a plurality of mirrors 303, condensed by a lens 302, and guided to a CCD (Charge Coupled Device) 301 which is the image reading portion so that the image on the original 201 is read. After the image on the original 201 has been read, the original 201 is conveyed by a conveying roller 209 and discharged to the original discharge portion 25 by a discharge roller 210.

Figure 5:
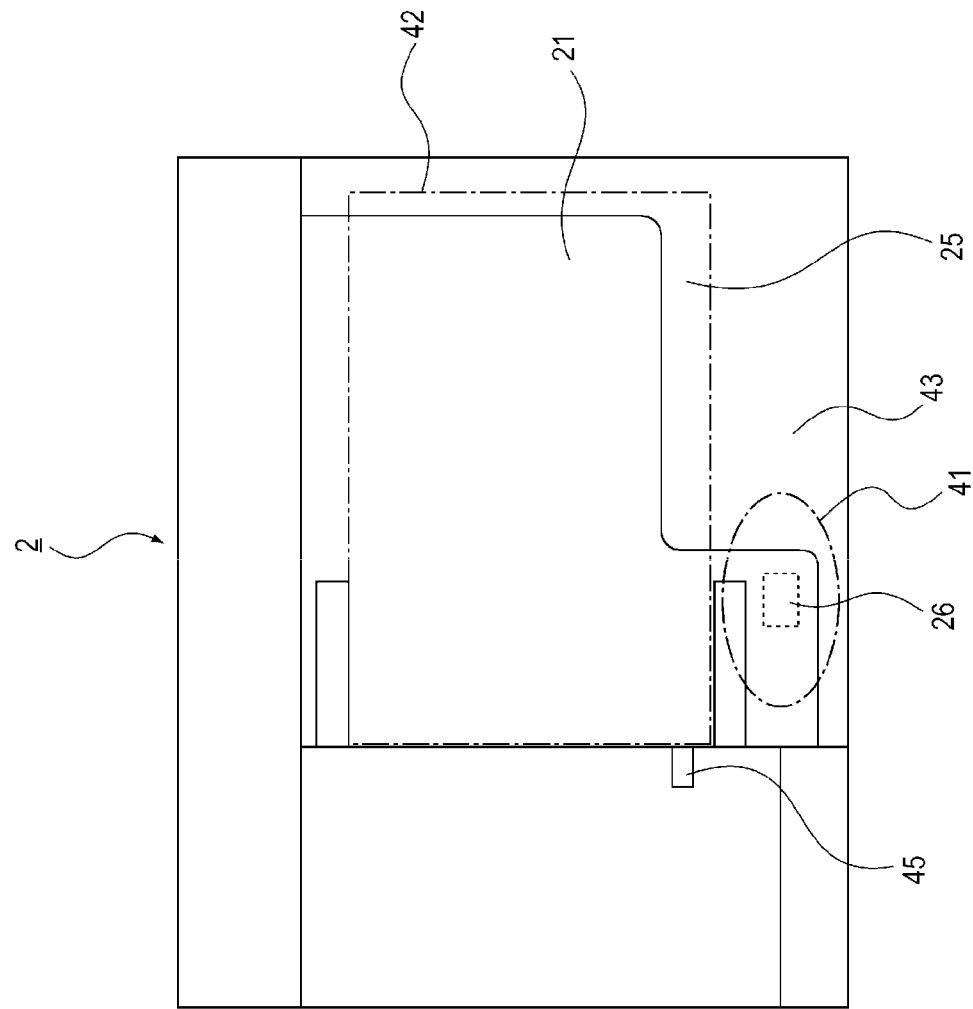
FIG. 5 is a plan illustration viewed from a direction of an arrow D in FIG. 3.

As illustrated in FIGS. 4 and 5, the illumination lamp 26 is disposed on the front side of the body of the image reading apparatus 2 (the left side in FIG. 4 and the bottom side in FIG. 5) on the bottom surface side of the placing portion 21 and is provided above an original discharge port 40 to which the discharge roller 210 is provided. The illumination lamp 26 is also disposed outside of the edge of the original 201 on the front side of the body of the image reading apparatus 2, the original 201 having the maximum size that can be used in the image reading apparatus 2 of the present embodiment.

The range of illumination 41 by the illumination lamp 26 is provided as follows. That is, at least a part of illumination light 44 from the illumination lamp 26 illuminates the extended portion 43 extending from the stacking area 42 in which the original 201 is stacked toward the front side of the body of the image reading apparatus 2, the original 201 having the maximum size that can be used in the image reading apparatus 2 of the present embodiment.

As a result, the extended portion 43 is illuminated by the illumination light 44 from the illumination lamp 26 regardless of the amount of the original 201 stacked in the stacking area 42 provided for the original 201 having the maximum size that can be used in the image reading apparatus 2 of the present embodiment. Therefore, the effect of allowing the user to recognize the original discharge portion 25 to which the original 201 is discharged can be obtained stably regardless of the amount of the original 201 stacked in the stacking area 42 provided for the original 201 having the maximum size that can be used in the image reading apparatus 2 of the present embodiment.

The stacking area 42 in which the original 201 is stacked corresponds to a discharge path of the original 201 discharged from the original discharge port 40, the original 201 having the maximum size that can be used in the image reading apparatus 2 of the present embodiment. The range of illumination 41 by the illumination lamp 26 is positioned outside the stacking area 42 in which the original 201 is stacked on the front side of the body of the image reading apparatus 2, namely, outside the discharge path of the original 201 having the maximum size that can be used in the image reading apparatus 2 of the present embodiment.

The illumination lamp 26 is likewise positioned outside the stacking area 42 in which the original 201 is stacked on the front side of the body of the image reading apparatus 2, namely, outside the discharge path of the original 201 having the maximum size that can be used in the image reading apparatus 2 of the present embodiment. Therefore, the illumination light 44 from the illumination lamp 26 would not be completely intercepted by the original 201 being discharged, whereby the effect of allowing the user to recognize the original discharge portion 25 to which the original 201 is discharged can be obtained stably regardless of whether the original 201 is being discharged or has been discharged.

The range of illumination 41 by the illumination lamp 26 is provided on the front side of the body of the image reading apparatus 2 in the present embodiment, so that the extended portion 43 arranged on the side of the image reading apparatus 2 closer to the user who operates the apparatus is illuminated by the illumination light 44 from the illumination lamp 26. This arrangement of the range of illumination 41 improves the effect of allowing the user to recognize the original discharge portion 25 to which the original 201 is discharged as compared to the case where the range of illumination 41 by the illumination lamp 26 is provided in another place.

As illustrated in FIG. 5, most of the upper part of the range of illumination 41 by the illumination lamp 26 is covered by the placing portion 21. In the actual copying machine A, however, the user looks down the range of illumination 41 at an angle from above in front of the image reading apparatus 2 in the direction as indicated by an arrow E in FIG. 4. Therefore, the range of illumination 41 by the illumination lamp 26 can be visually recognized by the user sufficiently from the direction indicated by the arrow E in FIG. 4 in spite of the fact that the upper part of the range of illumination 41 is covered by the placing portion 21.

Since the illumination lamp 26 being provided on the bottom surface side of the placing portion 21, in the present embodiment, the user standing at a normal operational position can recognize the original discharge portion 25 by the indirect light illuminating the extended portion 43 without visually recognizing the illumination lamp 26 in a direct manner. The user is not dazzled by the light since the illumination lamp 26 does not directly come into his/her view.

Although the light from the lighting in a room where the copying machine A is installed and the sunlight reach the extended portion 43, the user can visually recognize the illumination light 44 from the illumination lamp 26 sufficiently because the extended portion 43 is illuminated by the illumination light 44 at close range. It is better to blink the illumination lamp 26 in order to improve the recognition effect by the user.

The brightness of the illumination lamp 26 is relatively high and is different from lamps directly and visually recognized by the user such as the set original notification lamp 45 which lights up to inform that the original has been set in the placing portion 21, and a lamp (not shown) which indicates the operating state of the image reading apparatus and the image forming apparatus. Thus, the illumination lamp 26 is hardly confused with the other lamps.

According to the present embodiment illustrated in FIG. 4 as one example, the range of illumination 41 by the illumination lamp 26 does not overlap with the stacking area 42 for the original 201 having the maximum size that can be used in the image reading apparatus 2 of the present embodiment.

However, the range of illumination 41 by the illumination lamp 26 may partially overlap with the stacking area 42 for the original 201 having the maximum size that can be used in the image reading apparatus 2 of the present embodiment. The effect of allowing the user to recognize the original discharge portion 25 can be obtained sufficiently although the stability of the illuminated state of the extended portion 43 is slightly reduced.

Figure 6:
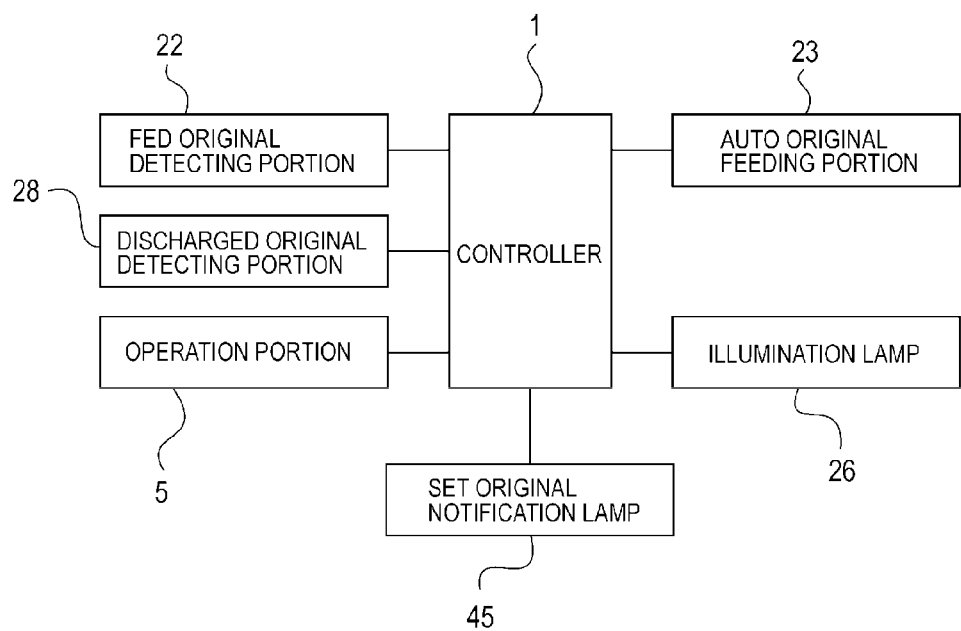
FIG. 6 is a block diagram illustrating a configuration of a control system of the image reading apparatus according to the present invention.

FIG. 6 is a block diagram illustrating the configuration of a control system according to the present embodiment. A detection signal from each of the fed original detecting portion 22 and the discharged original detecting portion 28 as well as an operation signal from the operation portion 5 are input to the controller 1. The controller 1 controls the auto original feeding portion 23, the illumination lamp 26, and the set original notification lamp 45.

The original reading process performed by the controller 1 of the copying machine A will now be described by using a flowchart in FIG. 7.

Figure 7:
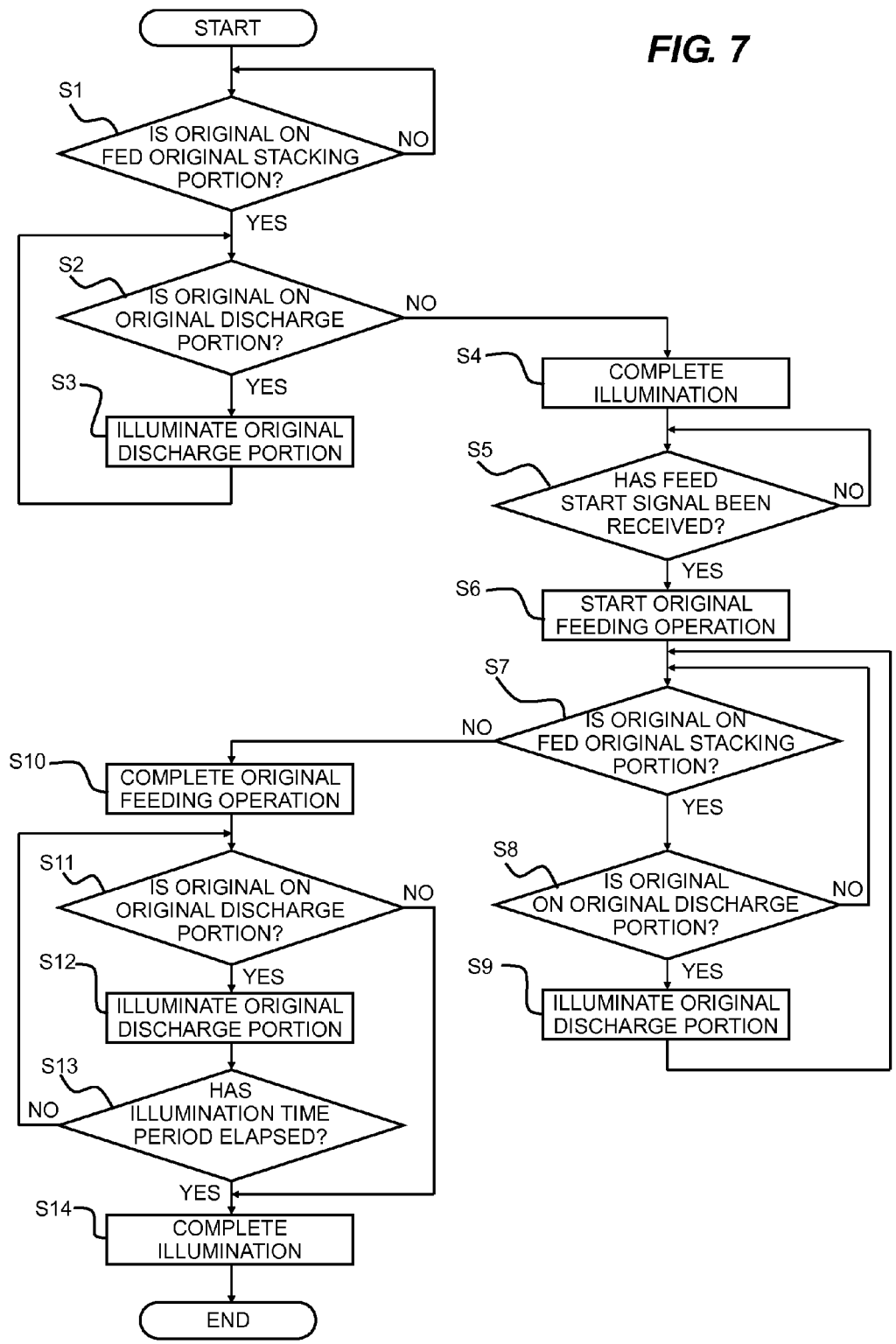
FIG. 7 is a flowchart describing an image reading process of the image reading apparatus according to the present invention.

In step S1 in FIG. 7, the controller 1 determines, based on the detection signal from the fed original detecting portion 22, whether or not the original 201 is stacked on the placing portion 21. When the controller 1 has determined that the original 201 is stacked on the placing portion 21 in step S1, the process proceeds to step S2 where the discharged original detecting portion 28 detects the presence of the original 201 on the original discharge portion 25. When it has been detected in step S2 that the original 201 is not on the original discharge portion 25, the original discharge portion 25 is not illuminated by the illumination lamp 26.

When it has been detected in step S2 that the original 201 is on the original discharge portion 25, the process proceeds to step S3 where the original discharge portion 25 is illuminated by the illumination lamp 26. The process thereafter goes back to step S2 where the discharged original detecting portion 28 detects the presence of the original 201 in order to detect whether or not the original 201 has been removed from the original discharge portion 25. When it has been detected in step S2 that the original 201 is on the original discharge portion 25, the process proceeds to step S3 where the original discharge portion 25 will be illuminated by the illumination lamp 26 until the original 201 on the original discharge portion 25 will have been removed therefrom. When it has been detected in step S2 that the original 201 is not on the original discharge portion 25, the process proceeds to step S4 where the illumination lamp 26 stops illuminating the original discharge portion 25.

In the present embodiment, the original discharge portion 25 is illuminated by the illumination lamp 26 in the case where the original 201 is on the original discharge portion 25 when the user has stacked (set) the original 201 on the placing portion 21. That is, the illumination lamp 26 does not operate when the original 201 is not on the original discharge portion 25, thereby contributing to the energy saving.

Once a start reading button of the operation portion 5 has been depressed and a feed start signal of the original 201 has been received by the controller 1 in step S5, the process proceeds to step S6 where the controller 1 controls the auto original feeding portion 23 to start feeding the original 201. In step S7, the controller 1 determines, based on the detection signal from the fed original detecting portion 22, whether or not the original 201 is on the placing portion 21. When the original 201 is on the placing portion 21, the process proceeds to step S8.

In step S8, the controller 1 determines, based on the detection signal from the discharged original detecting portion 28, whether or not the original 201 is on the original discharge portion 25. When the original 201 is on the original discharge portion 25, the process proceeds to step S9 where the original discharge portion 25 is illuminated by the illumination lamp 26, and the process thereafter goes back to step S7.

In step S6, the original 201 on the placing portion 21 is separated into a single sheet and fed in a continuous manner until the controller 1 determines, based on the detection signal from the fed original detecting portion 22, that the original 201 is not on the placing portion 21 in step S7. The process then proceeds to step S10 to complete the feeding operation performed on the original 201.

After the original 201 has been fed, the controller 1 determines, based on the detection signal from the discharged original detecting portion 28, whether or not the original 201 is on the original discharge portion 25 in step S11. When the original 201 is on the original discharge portion 25, the process proceeds to step S12 where the original discharge portion 25 is illuminated by the illumination lamp 26. In step S13, the controller 1 determines whether or not a predetermined set time has elapsed. When it has been determined in step S13 that the predetermined set time has not elapsed, the process goes back to step S11 where the illumination lamp 26 continues illuminating the original discharge portion 25.

When the controller 1 has determined in step S11 based on the detection signal from the discharged original detecting portion 28 that the original 201 has been removed from the original discharge portion 25, the process proceeds to step S14 where the illumination lamp 26 completes the illumination. The illumination lamp 26 completes the illumination (step S14) after the predetermined illumination time period by the illumination lamp 26 has elapsed in step S13, even when the original 201 is not removed from the original discharge portion 25 in step S11.

By the aforementioned control, the original discharge portion 25 is illuminated by the illumination lamp 26 once the user has stacked (set) the original 201 on the placing portion 21, so that the original discharge portion 25 is illuminated by the illumination lamp 26 when the original 201 left behind by the previous user is on the original discharge portion 25, thereby allowing the user to notice the original 201 left behind on the original discharge portion 25.

As a result, in the original discharge portion 25, the original 201 left behind by the previous user on the original discharge portion 25 is not confused with the original 201 for the next user discharged to the original discharge portion 25 after the image on the original 201 has been read. There can thus be prevented a case where the next user takes away the original 201 for the previous user by mistake in addition to his/her own original 201, for example. There can also be prevented a case where a large amount of the original 201 for the previous user is left behind in the original discharge portion 25 to cause a paper jam at the original discharge port 40.

In the present embodiment, the illumination lamp 26 and the range of illumination 41 by the illumination lamp 26 are positioned outside the stacking area 42 for the original 201 having the maximum size that can be used in the image reading apparatus 2 of the present embodiment. As a result, the extended portion 43 is illuminated by the illumination light 44 from the illumination lamp 26 regardless of the amount of the original 201 having the maximum size stacked in the stacking area 42. Therefore, the effect of allowing the user to recognize the original discharge portion 25 to which the original 201 is discharged can be obtained stably regardless of the amount of the original 201 having the maximum size stacked in the stacking area 42.

Moreover, the illumination lamp 26 and the range of illumination 41 by the illumination lamp 26 are positioned outside the original conveyance path of the original 201 having the maximum size that can be used in the image reading apparatus 2 of the present embodiment. As a result, the illumination light 44 is not completely intercepted by the original 201 being discharged, whereby the effect of allowing the user to recognize the original discharge portion 25 to which the original 201 is discharged can be obtained stably regardless of whether the original 201 is being discharged or has been discharged.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-060956, filed Mar. 16, 2012, which is hereby incorporated by reference herein in its entirety.

What is claimed is:

1. An image reading apparatus comprising:
    a placing portion on which an original being fed is placed;
    an original conveying portion which conveys the original placed on the placing portion;
    an image reading portion which reads an image on the original conveyed by the original conveying portion;
    a stacking portion which is disposed under the placing portion and on which the original read by the image reading portion is stacked; and
    an illuminating portion which is disposed above the stacking portion and below the placing portion to illuminate the stacking portion,
    wherein the stacking portion includes a stacking area on which an original of a maximum size is stacked and an extended portion extending from the stacking area into a width direction of the original orthogonal to an original conveyance direction, and
    wherein a range of illumination by the illuminating portion includes at least a part of the extended portion.

2. The image reading apparatus according to claim 1, wherein the placing portion includes an upper surface of a tray, and
    the illuminating portion is attached on a lower portion of the tray.

3. The image reading apparatus according to claim 1, wherein the illuminating portion is provided above an original discharge port through which the original is discharged onto the stacking portion.

4. The image reading apparatus according to claim 1, wherein the range of illumination by the illuminating portion is disposed on a front side of a body of the image reading apparatus in the width direction.

5. An image reading apparatus comprising:
    an original tray having a top surface on which an original is placed;
    an original conveying portion which conveys the original placed on the original tray;

an image reading portion which reads an image on the original conveyed by the original conveying portion;

a stacking portion which is disposed below the original tray and on which the original read by the image reading portion is stacked; and an illuminating portion which illuminates the stacking portion and is located on a bottom surface of the original tray facing the stacking portion, wherein the stacking portion includes a stacking area, on which a maximum-sized original in a width direction of the original orthogonal to an original conveyance direction is stacked, and an extended portion extending from the stacking area into the width direction, and wherein a range of illumination by the illuminating portion includes at least a part of the extended portion, and wherein the illuminating portion is disposed at a position outside the stacking area in the width direction.

6. The image reading apparatus according to claim 1, wherein the illuminating portion is disposed outside the stacking area in the width direction.

* * * * *